United States Patent
Nagase et al.

(10) Patent No.: US 8,052,774 B2
(45) Date of Patent: Nov. 8, 2011

(54) METHOD FOR CONCENTRATION OF GOLD IN COPPER SULFIDE MINERALS

(75) Inventors: Noriyuki Nagase, Niihama (JP); Satoshi Asano, Niihama (JP); Masatoshi Takano, Niihama (JP); Kenji Takeda, Niihama (JP); Shinichi Heguri, Niihama (JP); Atsushi Idegami, Niihama (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 12/659,832

(22) Filed: Mar. 23, 2010

(65) Prior Publication Data

US 2010/0242681 A1 Sep. 30, 2010

(30) Foreign Application Priority Data

Mar. 31, 2009 (JP) ................................. 2009-084108
Sep. 7, 2009 (JP) ................................. 2009-205537

(51) Int. Cl.
*C22B 3/08* (2006.01)
*C22B 3/20* (2006.01)
*C22B 3/22* (2006.01)
*C22B 3/42* (2006.01)

(52) U.S. Cl. ................. 75/741; 75/423; 75/744; 423/34; 423/36; 210/162; 210/175; 210/176; 205/568; 205/571

(58) Field of Classification Search ................ 75/744, 75/741, 423; 423/34, 36; 205/568, 571; 210/162, 175, 176
See application file for complete search history.

(56) References Cited

U.S. PATENT DOCUMENTS

| 3,793,429 | A | * | 2/1974 | Queneau et al. | ................. 423/34 |
| 3,816,105 | A | * | 6/1974 | McKay et al. | ................. 75/718 |
| 4,441,993 | A | * | 4/1984 | Howald | ............................. 209/5 |
| 6,503,293 | B1 | * | 1/2003 | Dempsey et al. | ............... 75/743 |
| 6,537,440 | B1 | * | 3/2003 | Richmond et al. | ............ 205/580 |
| 7,219,804 | B2 | * | 5/2007 | Simmons et al. | ............. 209/166 |
| 7,785,395 | B2 | * | 8/2010 | Leppinen et al. | ............... 75/739 |

FOREIGN PATENT DOCUMENTS

| JP | 2001-515145 | | 9/2001 |
| JP | 2002-053310 | A | 2/2002 |
| JP | 2004-504492 | | 2/2004 |
| JP | 2005-042155 | A | 2/2005 |
| WO | WO 2009068735 | A1 * | 6/2009 |

* cited by examiner

*Primary Examiner* — George Wyszomierski
*Assistant Examiner* — Tima M McGurthry Banks
(74) *Attorney, Agent, or Firm* — Edwards Angell Palmer & Dodge LLP; James E. Armstrong, IV; Junko Harada

(57) ABSTRACT

Disclosed herein is a method for concentrating gold contained in a leach residue obtained in a copper hydrometallurgical process for recovering copper from a copper sulfide mineral to efficiently separate and recover gold from the leach residue: a gold-bearing copper sulfide mineral is subjected to pressure leaching with sulfuric acid at a temperature higher than 102° C. and 112° C. or lower to obtain a leach residue, and the leach residue is subjected to flotation to separate it into a float fraction and a sink fraction; the float fraction obtained by flotation is desulfurized to obtain a desulfurized product; the desulfurized product is subjected to oxidative roasting to obtain an oxidatively-roasted product; the oxidatively-roasted product is dissolved in a sulfuric acid solution to obtain a copper solution, and a gold-bearing residue is separated and recovered from the copper solution.

20 Claims, No Drawings

METHOD FOR CONCENTRATION OF GOLD IN COPPER SULFIDE MINERALS

BACKGROUND OF THE INVENTION

1. Field of the Invention

The present invention relates to a method for concentration and recovery of gold in a leach residue obtained by leaching copper from a gold-bearing copper sulfide mineral in a copper hydrometallurgical process for recovering copper from a copper sulfide mineral.

2. Description of the Related Art

Copper sulfide minerals used as raw materials for copper smelting contain copper-containing components such as chalcopyrite, bornite, and chalcocite, iron-containing components such as pyrite, gangue components containing silicon, calcium, etc., and noble metal components such as gold.

In a typical copper pyrometallurgical process, the copper sulfide mineral is concentrated to obtain a copper concentrate with high copper grade, and then the copper concentrate is smelted in a furnace in a smelting process. At this time, iron and sulfur are separated as a slag and a gas, and the copper concentrate is converted into blister copper. Then, the blister copper is processed into anode copper and electrolytically refined in an electrolysis process. In the electrolysis process, copper is separated from gold and other impurities, electrodeposited onto a cathode, and recovered as electrolytic copper.

Such a copper pyrometallurgical process is highly productive, but has problems that capital investment is very high, it takes much time, effort, and cost to treat generated gas and slag, and operational adjustment is difficult. For this reason, a copper hydrometallurgical process has been recently developed, which can be performed by more compact facilities than the copper pyrometallugrical process and can achieve operational adjustment with ease.

For example, Japanese Patent Kohyo No. 2004-504492 proposes a copper hydrometallurgical process including a step of subjecting a copper-containing material to pressure leaching at approximately 170 to 235° C. to obtain a leach residue and a copper-containing solution, a step of diluting the copper-containing solution with a diluent to prepare a dilute copper-containing solution, and a step of extracting copper from the dilute copper-containing solution with a solvent. According to this method, however, gold contained in the copper-containing material is dispersed throughout the leach residue obtained by pressure leaching. Therefore, it is necessary to treat the entire leach residue again to recover gold, which requires very high cost.

Japanese Patent Kohyo No. 2001-515145 proposes a process for leaching of copper from a sulfide ore, which includes oxidizing ores or concentrates under pressure in the presence of oxygen and an acidic solution containing a halide and sulfate ions to obtain a slurry, subjecting the slurry to solid-liquid separation to obtain a filtrate and a solid residue containing a basic metal sulfate, and subjecting the solid residue to leaching with an acidic sulfate solution. A leach solution is separated from the solid residue and subjected to solvent extraction to produce a metal-rich solution (pregnant liquor) and a metal-depleted raffinate (barren liquor). However, a leach residue obtained by this method is a mixture of iron oxide micro particles and sulfur micro particles, and therefore it is difficult to separate and recover gold from the leach residue.

As a method for separating iron oxide and sulfur from such a leach residue obtained by copper leaching, a method proposed in Japanese Patent Kokai No. 2002-053310 is known. This method includes subjecting a leach residue, which is obtained by subjecting a sulfur-containing material such as a zinc concentrate to leaching in a leaching step, to flotation to obtain a sulfur-rich float fraction, heating the float fraction to a temperature equal to or higher than the melting point of sulfur but lower than the boiling point of sulfur to produce sulfur vapor, and cooling a gas containing the sulfur vapor at a temperature lower than the melting point of sulfur to condense and recover sulfur. This method makes it possible to efficiently recover sulfur from a leach residue obtained by subjecting a zinc concentrate to leaching.

Japanese Patent Kokai No. 2005-042155 proposes a method for concentrating noble metals contained in a leach residue obtained by leaching copper from a copper ore or a copper mineral. According to this method, the leach residue is heated at a temperature of 550° C. of higher under a nonoxidative atmosphere to produce a calcined ore, and the calcined ore is again subjected to leaching with an acidic solution to obtain a leach residue containing sulfur and noble metals and a leach solution containing iron. However, gangue components contained in a copper mineral or a copper concentrate are often distributed in the same manner as noble metals. Therefore, in a case where a copper mineral or copper concentrate containing a large amount of gangue components is treated by this method, there is a problem that it takes much time and effort to separate noble metals from the gangue components.

As described above, in a copper hydrometallurgical process for recovering copper from a gold-bearing copper sulfide mineral, a leach residue obtained by leaching copper from the copper sulfide mineral contains gold, but it is very difficult to concentrate gold contained in the leach residue, thereby making it impossible to efficiently recover gold from the leach residue.

SUMMARY OF THE INVENTION

The present invention has been made in view of the above-described circumstances, and it is an object of the present invention to provide a method for concentrating gold contained in a leach residue obtained by leaching copper from a copper sulfide mineral with sulfuric acid so as to efficiently separate and recover gold from the leach residue.

In order to achieve the above object, the present inventors have observed a leach residue obtained by leaching copper from a copper sulfide mineral such as a copper concentrate with sulfuric acid, and as a result, they have found that gold remaining in the leach residue of the copper sulfide mineral is surrounded by sulfur whose hydrophobicity is similar to that of gold, or is attached to unreacted sulfides remaining in the leach residue, but is not present in other components such as iron oxide and gangue. The reason why gold is surrounded by sulfur can be considered as follows. Sulfur separated from the copper sulfide mineral by leaching is in a molten state because the melting point of sulfur is as low as approximately 112 to 120° C., and is then solidified into particles by cooling so as to surround gold as a nucleus.

Further, the present inventors have found that gold contained in a leach residue obtained by subjecting a copper sulfide mineral to leaching can be concentrated by subjecting the leach residue to flotation utilizing a difference in hydrophobicity to separate it into a float fraction containing micro particles of sulfur and particles of sulfides remaining in the leach residue without being leached and a sink fraction containing iron oxide and gangue components, desulfurizing the float fraction to obtain a desulfurized product, and then subjecting the desulfurized product to oxidative roasting and then to leaching with sulfuric acid or subjecting the desulfurized product to leaching again.

Specifically, a first aspect of the present invention provides a method for concentrating gold contained in a copper sulfide mineral, the method including a leaching step of subjecting a gold-bearing copper sulfide mineral to pressure leaching with sulfuric acid at a temperature higher than 102° C. and 112° C. or lower to obtain a leach residue, a flotation step of subjecting the leach residue to flotation to separate it into a float fraction and a sink fraction, a desulfurization step of subjecting the float fraction to desulfurization to obtain a desulfurized product, an oxidative roasting step of subjecting the desulfurized product to oxidative roasting to obtain an oxidatively-roasted product, and a separation step of dissolving the oxidatively-roasted product in a sulfuric acid solution to obtain a copper solution and a gold-bearing residue and separating the gold-bearing residue from the copper solution.

According to the first aspect of the present invention, in the desulfurization step, the float fraction is preferably heated at a temperature of 250° C. or higher and 800° C. or lower under an inert atmosphere of flowing nitrogen gas or argon gas. Further, in the oxidative roasting step, the desulfurized product is preferably heated at a temperature of 600° C. or higher and 800° C. or lower under an atmosphere of flowing oxygen or air.

A second aspect of the present invention provides a method for concentrating gold contained in a leach residue of a gold-bearing copper sulfide mineral obtained in a copper hydrometallurgical process to obtain a gold-bearing residue, the method including a leaching step of subjecting a gold-bearing copper sulfide mineral to leaching to obtain a leach residue, a flotation step of subjecting the leach residue to flotation to separate it into a float fraction and a sink fraction, and a desulfurization step of subjecting the float fraction to desulfurization to obtain a desulfurized product, wherein the desulfurized product is returned to the leaching step to repeatedly perform the leaching step, the flotation step, and the desulfurization step in this order to obtain a gold-bearing residue in which gold is concentrated.

These methods according to the present invention make it possible to concentrate gold contained in a leach residue obtained by subjecting a gold-bearing copper sulfide mineral to leaching in a copper hydrometallurgical process to efficiently separate and recover gold from the leach residue. Further, since the recovered gold is concentrated in the gold-bearing residue, the amount of material to be treated in subsequent steps is small, thereby reducing the time and effort required for handling and the size of production facilities. Further, the gold concentrated in the gold-bearing residue is easily leached, and therefore can be recovered by extraction with a small amount of reagent such as cyanide, thiourea, or thiosulfate, thereby reducing cost.

DETAILED DESCRIPTION OF THE INVENTION

A first aspect of the present invention provides a method for obtaining a gold concentrate from a leach residue obtained by subjecting a gold-bearing copper sulfide mineral such as a copper concentrate to pressure leaching with an acidic solution of a mineral acid such as sulfuric acid at a temperature lower than the melting point of sulfur in a leaching step. More specifically, first in the above leaching step, pressure is applied on a gold-bearing copper sulfide mineral by a pressure device such as an autoclave at a temperature lower than the melting point of representative sulfur which stably exists. As a result, copper is leached into sulfuric acid.

The temperature lower than the melting point of representative sulfur which stably exists is 112° C. or lower because the melting point of α-sulfur is 112.8° C. and the melting point of β-sulfur is 119.0° C. However, if the leaching temperature is 102° C. or lower, copper leaching efficiency is lowered. Therefore, the leaching temperature is preferably 112° C. or lower but higher than 102° C.

The above-described pressure leaching can be performed using a pressure device such as an autoclave in the same manner as in conventional pressure leaching except that the leaching temperature is set to a value within the above range. For example, the pressure leaching can be performed in the following manner. A slurry is prepared by mixing a copper sulfide mineral such as a copper concentrate and a sulfuric acid solution and is placed in a vessel made of, for example, quartz, and then the vessel is placed in an autoclave. The autoclave is maintained at a predetermined temperature, and oxygen is supplied into the autoclave so that the pressure in the autoclave is increased to be 0.5 to 2 MPa higher than the pressure of a gas phase in equilibrium at the predetermined temperature. The supply of oxygen is continued until the consumption of oxygen is completed. In this way, copper is leached from the copper sulfide mineral, and a leach residue is obtained.

The leach residue obtained in the leaching step by performing leaching at a temperature lower than the melting point of sulfur is finer than that obtained by conventional leaching performed at a temperature equal to or higher than the melting point of sulfur. The reason for this is not apparent, but it can be considered that, since copper is separated from a copper sulfide mineral by performing leaching at a reaction temperature lower than the melting point of sulfur, fusion bonding between sulfur particles does not occur and sulfur particles are less likely to form aggregates with sulfide particles, and therefore coarse sulfur particles are not formed.

Pyrite contained in a copper sulfide mineral is less likely to be leached at a temperature lower than the melting point of sulfur than at a temperature equal to or higher than the melting point of sulfur. Therefore, the amount of a leach residue obtained by the pressure leaching is increased, thereby relatively reducing the gold grade of a gold-bearing residue obtained by treating the leach residue. However, the leach residue obtained by the method according to the first aspect of the present invention is fine, and therefore sulfur and sulfides can be reliably separated by flotation as a float fraction. This makes it possible to reduce the amount of gold contained in a sink fraction separated by flotation and then disposed of, thereby reducing the amount of gold discharged to the outside of the system.

After the completion of the leaching step, the slurry is filtered to separate it into a leach residue and a leach solution. The thus obtained leach residue is fine and therefore can be directly used in the next flotation step without screening. It is to be noted that the leach residue contains sulfur and sulfides in addition to iron oxide, gangue components, and the unreacted copper sulfide mineral. Gold present in the leach residue is attached to the sulfur or sulfides.

In the flotation step, the leach residue is separated into a float fraction and a sink fraction by a known flotation method. For example, the leach residue is introduced into water, and then a flotation reagent such as a frother and a collector is added thereto to mechanically or chemically generate gas bubbles such as air bubbles. As a result, sulfur particles or sulfide particles, to which gold is easily attached, adhere to the gas bubbles and rise to the surface as a float fraction, but the others such as iron oxide and gangue components are contained in a sink fraction.

In the next desulfurization step, sulfur is removed from the float fraction obtained in the above flotation step. More specifically, the float fraction is placed in a furnace, through which an inert gas such as nitrogen or argon flows, to volatilize sulfur by heating so that nonvolatile gold is separated from sulfur. It is to be noted that the volatilization of sulfur may be performed by lowering the pressure in the furnace instead of making inside of the furnace in an inert gas atmosphere. However, a method using the flow of an inert gas is preferably used, because volatilized sulfur can be carried by an inert gas flowing through the furnace and therefore sulfur is easily separated from the float fraction.

The temperature of heating to volatilize sulfur is preferably in the range of 250 to 800° C., more preferably in the range of 300 to 400° C. The temperature required to volatilize sulfur is 250° C. or higher because, if the heating temperature is lower than 250° C., sulfur contained in the leach residue cannot be sufficiently volatilized so that sulfur remains in the leach residue in a molten state, or volatilized sulfur is condensed in the furnace so that blockage occurs in the furnace. On the other hand, the heating temperature of 300° C. or higher is more preferable because volatilization of sulfur is promoted and is therefore completed in a short period of time.

However, even when the heating temperature exceeds 400° C., the volatilization speed of sulfur is hardly increased but energy required for heating is significantly increased. Further, if the heating temperature exceeds 800° C., decomposition of sulfides is promoted and the leach residue begins to consolidate as if it were sintered, which causes a problem in handling the leach residue. If the leach residue is consolidated, handling of the leach residue in subsequent steps is adversely affected. It is to be noted that volatilized sulfur is deposited in a temperature range lower than 250° C. and is therefore easily recovered.

A desulfurized product obtained in the desulfurization step is sent to the next oxidative roasting step. In the oxidative roasting step, the desulfurized product is roasted in the presence of oxygen or air so that sulfides contained in the desulfurized product, such as chalcopyrite and pyrite, are oxidized into readily-soluble copper oxide and hematite that is a poorly-soluble iron oxide, respectively. The roasting of the desulfurized product can be performed at a temperature of 800° C. or lower, but is preferably performed at a temperature of 600° C. or higher but 800° C. or lower in practice.

If the temperature of heating during oxidative roasting is lower than 600° C., oxidation reaction proceeds slowly and insufficiently, and iron contained in the leach residue is not converted into poorly-soluble hematite but is converted into readily-soluble iron sulfate. It is to be noted that separation of gold is not directly affected by the generation of iron sulfate. However, if iron sulfate is generated in the oxidative roasting step, iron sulfate as well as copper oxide is dissolved by acid in the next separation step, which creates the necessity to additionally perform treatment to separate copper and iron contained in the solution from each other. For this reason, it is preferable that the desulfurized product is roasted at a temperature of 600° C. or higher to prevent the generation of iron sulfate.

On the other hand, if the desulfurized product is subjected to oxidative roasting at a temperature higher than 800° C., copper remaining in the desulfurized product without being leached in the leaching step is converted into copper I oxide that is poorly soluble in acid. In this case, copper I oxide is not completely dissolved in sulfuric acid in the next separation step and therefore remains as a residue, which makes it difficult to concentrate gold. Further, as described above, particles of the leach residue begin to consolidate at a temperature higher than 800° C. as if they were sintered. In this case, if oxidatively-roasted copper is present, particles of the leach residue are more likely to consolidate, which is disadvantageous from the viewpoint of handling.

In view of all these circumstances, the temperature of heating during oxidative roasting of the desulfurized product is preferably in the range of 630 to 800° C., most preferably in the range of 680 to 700° C., because copper oxide that is readily soluble in acid can be generated and, at the same time, iron sulfate is reliably decomposed and hematite that is stable and poorly soluble in acid can be obtained.

An oxidatively-roasted product obtained in the oxidative roasting step is sent to the next separation step. In the separation step, the oxidatively-roasted product is mixed with a sulfuric acid solution so that copper is selectively leached with sulfuric acid, that is, copper is dissolved in sulfuric acid. On the other hand, gold is not leached with sulfuric acid and remains in the oxidatively-roasted product together with hematite. Therefore, gold can be separated as a gold-bearing residue in which gold is concentrated. A main component other than gold of the gold-bearing residue obtained in this separation step is oxidatively-roasted iron that is chemically stable such as hematite. Therefore, gold can be refined in an additional step by leaching gold from the gold-bearing residue by a conventional chemical method using cyanide or thiourea.

The concentration of sulfuric acid in the sulfuric acid solution used in the separation step is preferably in the range of 200 g/L to 500 g/L. If the concentration of sulfuric acid is less than 200 g/L, the ability of the sulfuric acid solution to dissolve copper is not sufficient. On the other hand, if the concentration of sulfuric acid exceeds 500 g/L, the solubility of copper in the sulfuric acid solution is significantly reduced so that the amount of the sulfuric acid solution required for leaching is increased. Further, the concentration of a slurry prepared in the separation step to leach copper with sulfuric acid is preferably in the range of 100 g/L to 300 g/L. If the concentration of the slurry is less than 100 g/L, the amount of the slurry is increased. On the other hand, if the concentration of the slurry exceeds 300 g/L, reactivity becomes poor and power required for stirring is increased.

It is to be noted that a copper sulfate solution (a solution in which copper is dissolved) separated from the gold-bearing residue in the separation step can be subjected to conventional electrowinning to recover copper as electrolytic copper. Sulfuric acid regenerated by electrowinning can be reused in the above-described leaching step to leach copper from a copper sulfide mineral or in the above-described separation step to dissolve copper.

A method according to a second aspect of the present invention will be described below. The second aspect provides a method for concentrating gold contained in a copper sulfide mineral including a step of subjecting a gold-bearing copper sulfide mineral to leaching to obtain a leach residue (leaching step), a step of subjecting the leach residue to floatation to separate it into a float fraction and a sink fraction (flotation step), and a step of subjecting the float fraction to desulfurization to obtain a desulfurized product (desulfurization step). The desulfurized product is returned to the leaching step to repeatedly perform the leaching step, the flotation step, and the desulfurization step in this order to concentrate gold until a gold-bearing residue with a desired gold grade is obtained.

The leach residue of a copper sulfide mineral is a residue obtained by leaching copper from a copper sulfide mineral such as a copper concentrate by a given hydrometallurgical process. As a method of leaching copper from a copper sulfide mineral, the method described above in the first aspect of the present invention or a conventional method can be used. Examples of the conventional method include a leaching method using a mineral acid such as sulfuric acid, a leaching method proposed in the above-mentioned Japanese Patent Kohyo No. 2004-504492 or Japanese Patent Kohyo No. 2001-515145, and a leaching method using a chloride or a chlorine gas. Any of these methods can be used because the existence form of gold in a leach residue is not changed depending on which method is used.

However, in a case where a copper sulfide mineral contains a large amount of a mineral which cannot be leached, such as pyrite which cannot be leached when the leaching method using a chloride or a chlorine gas is used, it is difficult to use the method according to the second aspect of the present invention which will be described later. For example, in a case where a copper sulfide mineral contains a sulfide which will remain in a leach residue without being leached, it is difficult to perform the flotation step and the desulfurization step subsequent to the leaching step. Further, a molybdenum ore is also difficult to be leached by a hydrometallurgical process. Therefore, in a case where a copper sulfide mineral contains a large amount of molybdenum ore, it is difficult to use the method according to the second aspect of the present invention which will be described later.

The leach residue of a copper sulfide mineral is supplied to the next flotation step. Treatment performed in the flotation step is the same as that in the above-described method according to the first aspect of the present invention, and therefore description thereof will not be repeated.

In the next desulfurization step, sulfur is removed from the float fraction obtained in the flotation step to obtain a desulfurized product. More specifically, the float fraction is placed in a furnace filled with an inert gas such as nitrogen or argon or water vapor to volatilize sulfur by heating in the inert gas or to remove sulfur by chemical reaction with the water vapor. Gold and sulfides are neither volatilized nor reacted with water vapor, and therefore can be separated from sulfur. It is to be noted that the latter method in which sulfur is removed by chemical reaction with water vapor is called "Frasch process", which is generally used to recover sulfur, for example, in the mining of sulfur.

In a case where sulfur is removed from the float fraction by volatilization in an inert atmosphere such as nitrogen or argon, temperature conditions are the same as those in the above-described method according to the first aspect of the present invention. On the other hand, when the desulfurization step is performed by chemically reacting sulfur contained in the float fraction with water vapor, i.e., Frasch Process, the float fraction is preferably heated to approximately 165° C. More specifically, superheated steam at a temperature of approximately 165° C. is blown into the float fraction to react sulfur with the steam. In this process, the sulfur is decomposed into hydrogen sulfide gas and sulfur dioxide gas and removed. The removed sulfur can be easily recovered because solid sulfur is deposited by cooling a mixed gas of generated hydrogen sulfide and sulfur dioxide.

As described above, the desulfurized product obtained in the desulfurization step is then returned to the leaching step and is again treated together with a copper sulfide mineral in the leaching step, the floating step, and the desulfurization step in this order. The desulfurized product obtained in the desulfurization step is mainly composed of gold and sulfides, and therefore the sulfides remaining in the desulfurized product can be decomposed and removed at a higher level by repeating these steps once or more. As a result, a gold-bearing residue with high gold grade is obtained.

By returning the desulfurized product to the leaching step to treat the desulfurized product together with a fresh copper sulfide mineral such as a copper concentrate, sulfides remaining in the desulfurized product are leached. Therefore, it can be expected that a copper recovery rate and a gold grade will be increased. In the leaching step, gold contained in the desulfurized product is surrounded by sulfur and concentrated in a leach residue together with gold contained in the fresh copper sulfide mineral. The leach residue obtained in the leaching step is subsequently treated in the floating step and then in the desulfurization step. As a result, a desulfurized product with a higher gold grade can be obtained. If necessary, the desulfurized product obtained by repeated treatment can be again returned to the leaching step and a series of steps including the leaching step, the flotation step, and the desulfurization step can be repeated as many times as needed to recover a gold-bearing residue with a desired gold grade.

An optimum material to be returned to the leaching step is a desulfurized product obtained by removing oxides, gangue components, and sulfur from a copper sulfide mineral. This is because if a leach residue containing iron oxide and gangue components is returned to the leaching step, power required for stirring a slurry in the leaching step is increased due to an increase in the concentration of the slurry or a larger filtration apparatus is required. If a float fraction obtained in the flotation step is returned to the leaching step, gold and sulfides contained in the float fraction are in a state where they are surrounded by sulfur, and therefore contact probability between the sulfides and a leachant is low, which makes it difficult to leach the sulfides. This causes an increase in the amount of leach residue, which is disadvantageous for the concentration of gold.

It is to be noted that the leaching step, floating step, and desulfurization step have been described above on the assumption that they are performed in batches. However, even when these steps are performed continuously, the same effect can be obtained by returning part of a desulfurized product obtained in the desulfurization step to the leaching step. A main component other than gold of the gold-bearing residue obtained by the above-described method is a copper sulfide. Therefore, as in the case of the method according to the first aspect of the present invention, gold contained in the gold-bearing residue can be refined in an existing gold recovery process by using the gold-bearing residue as a raw material in a conventional pyrometallurgical process.

EXAMPLE 1

A copper concentrate with a gold grade of 12 g/t was mixed with a sulfuric acid solution to prepare 1 L of a slurry with a concentration of 200 g/L and concentration of a sulfuric acid is 30 g/L. The slurry was placed in a 3 L autoclave and maintained at 105° C. for 3 hours to leach copper from the copper concentrate by pressure leaching. In this process, oxygen was added to a gas phase portion of the autoclave, that is, to a saturated water vapor atmosphere to increase the pressure in the autoclave to 1.51 MPa.

After the completion of pressure leaching, the autoclave was cooled to room temperature, and then the slurry was taken out of the autoclave and filtered to obtain a leach residue. 400 mL of water was added to 149.2 g of the leach residue, and the mixture was stirred for 3 minutes to obtain a slurry. The slurry was placed in an Agitair laboratory flotation machine having a cell volume of 0.5 L, and 75 mg of methyl isobutyl carbinol (MIBC) was added as a frother per kg of the leach residue. Then, 60 mg of AERO 350 Xanthate (trade name) manufactured by Cytec Industries Inc. (US) was added as a collector per kg of the leach residue.

The slurry was stirred for 10 minutes, and then flotation was performed by blowing air into the slurry at a rate of 2 L/min for 8 minutes under stirring. As a result, 46.6 g of a float fraction and 76.8 g of a sink fraction were obtained. It is to be noted that in Example 1, a float fraction and a sink fraction were obtained by performing flotation once, but flotation may be repeatedly performed depending on the properties of a leach residue treated. In this case, the number of repetitions of flotation can be determined by appropriately performing a preliminary test.

The thus obtained float fraction was identified by chemical analysis, microscope observation, and X-ray diffraction. As a result, it was found that the float fraction was mainly composed of unreacted sulfide mineral components and elemental sulfur. Further, it was found by ICP analysis that the gold grade of the float fraction was 31 g/t. The sink fraction was also identified in the same manner, and as a result, it was found that the sink fraction was mostly occupied by iron oxide and gangue components and that the gold content of the sink fraction was less than 2 g/t which is a lower limit of measurement, that is, the sink fraction hardly contained gold.

Then, 46.6 g of the float fraction was dried and placed in a tubular furnace using a transparent quartz tube. The furnace was heated to 400° C. while a nitrogen gas was allowed to flow through the furnace at a flow rate of 1 L/min, and elemental sulfur was removed by volatilization for 4 hours while the float fraction in the furnace was visually observed from outside the furnace. As a result, 24.9 g of a desulfurized product was obtained.

The desulfurized product was identified by X-ray diffraction, and as a result, it was confirmed that elemental sulfur was completely removed by volatilization. The gold grade of the desulfurized product was increased to 63 g/t. Then, 24.9 g of the desulfurized product was again placed in the tubular furnace and heated at 680° C. for 4 hours while an oxygen gas was allowed to flow through the furnace at a flow rate of 1 L/min to oxidatively roast sulfides contained in the desulfurized product to obtain an oxidatively-roasted product. The oxidatively-roasted product was analyzed in the same manner as described above, and as a result, it was found that the gold grade of the oxidatively-roasted product was increased to 77 g/t.

After the completion of the oxidative roasting, the oxidatively-roasted product was recovered and 20.8 g of the recovered oxidatively-roasted product was mixed with 200 mL of a 200 g/L sulfuric acid solution to prepare a slurry. The slurry was placed in a beaker and heated in a water bath at 80° C. for 1 hour under stirring to leach copper. Then, the slurry was filtered for solid-liquid separation to obtain a residue. The residue was placed in a drier and dried at 105° C. for 12 hours to obtain 12.8 g of a gold-bearing residue. The gold-bearing residue was analyzed in the same manner as described above, and as a result, it was found that the gold grade of the gold-bearing residue was increased to 120 g/t.

In Example 1, the copper concentrate, float fraction, sink fraction, desulfurized product, oxidatively-roasted product, and gold-bearing residue were each dissolved in aqua regia and analyzed by ICP, and the obtained analytical values are summarized in Table 1. It is to be noted that in Table 1, the Cu content, Fe content, and S content are expressed in percent by weight (wt %), and the Au content is expressed in grams per ton (g/t).

TABLE 1

|  | Cu(wt %) | Fe(wt %) | S(wt %) | Au(g/t) |
| --- | --- | --- | --- | --- |
| Copper concentrate | 27.2 | 26.8 | 26.5 | 12 |
| Float fraction | 8.2 | 14.3 | 52.1 | 31 |
| Sink fraction | 0.43 | 22.2 | 9.0 | <2 |
| Desulfurized product | 15.2 | 27.3 | 33.7 | 63 |
| Oxidatively-roasted product | 17.9 | 31.0 | 0.96 | 77 |
| Gold-bearing residue | 1.2 | 42.8 | 0.24 | 120 |

As shown in Table 1, gold contained in the copper concentrate with a gold grade of 12 g/t was concentrated in the desulfurized product obtained by removing sulfur from the float fraction by volatilization, and the gold grade was increased to 63 g/t. The gold grade was further increased to 77 g/t by oxidatively roasting the desulfurized product at 680° C. Further, the gold was concentrated in the gold-bearing residue obtained by leaching copper from the oxidatively-roasted product with sulfuric acid, and the gold grade was increased to 120 g/t. On the other hand, the sink fraction to be disposed of was mainly composed of iron oxide, and the gold grade of the sink fraction was reduced to less than 2 g/t which is a lower limit of quantitative assay, and therefore a reduction in the loss of gold was achieved.

EXAMPLE 2

A leach residue of a copper concentrate was obtained in the same manner as in Example 1, and gold-bearing residues were obtained from the leach residue in the same manner as in Example 1 except that the heating temperature in the desulfurization step was changed to 230° C., 270° C., 430° C., 590° C., 750° C., and 830° C.

As a result, in a case where desulfurization was performed at 270° C., a desulfurized product with the same sulfur grade as the desulfurized product obtained in the Example 1 was obtained. Further, it was confirmed by X-ray diffraction that the desulfurized product contained no elemental sulfur. However, the speed at which sulfur was removed was low, and therefore unlike Example 1, removal of sulfur was not completed in 4 hours and took 6 hours or more. In cases where desulfurization was performed at 430° C., 590° C., and 750° C., desulfurized products with the same sulfur grade as the desulfurized product obtained in Example 1 were obtained, the desulfurized products contained no elemental sulfur, and the time required for removing sulfur was substantially the same as in Example 1.

On the other hand, in a case where desulfurization was performed at 230° C., the surface of the leach residue was covered with volatilized sulfur and sulfur particles remained in the leach residue. As a result, a desulfurized product with a lower gold grade than the desulfurized product obtained in Example 1 was obtained. In a case where desulfurization was performed at 830° C., the leach residue was consolidated as if it were sintered, which adversely affected handling in the subsequent steps. Therefore, in the separation step, dissolution of copper in a sulfuric acid solution did not proceed.

EXAMPLE 3

A leach residue of a copper concentrate was obtained in the same manner as in Example 1, and gold-bearing residues were obtained from the leach residue in the same manner as in Example 1 except that the heating temperature in the oxidative roasting step was changed to 580° C., 620° C., 780° C., and 830° C.

As a result, in cases where oxidative roasting was performed at 620° C. and 780° C., oxidatively-roasted products with the same grade as the oxidatively-roasted product obtained in Example 1 were obtained. Further, it was confirmed by X-ray diffraction that copper and iron were present as copper (II) oxide and hematite, respectively, in each of the oxidatively-roasted products.

On the other hand, in a case where oxidative roasting was performed at 580° C., it was confirmed by X-ray diffraction that copper was converted into copper (II) oxide but iron was converted into readily-soluble iron (II) sulfate. In a case where oxidative roasting was performed at 830° C., copper was converted into copper (I) oxide, and an obtained oxidatively-roasted product was difficult to handle because it was consolidated as if it were sintered. Therefore, in the separation step, it was impossible to dissolve copper in a sulfuric acid solution.

EXAMPLE 4

200 g of a copper concentrate with a gold grade of 2 g/t was mixed with an iron sulfate solution to prepare a slurry with a concentration of 200 g/L. The initial concentration of iron in the slurry was 43 g/L, and the initial concentration of sulfuric acid in the slurry was 30 g/L.

1 L of the slurry was placed in a quartz vessel, and the quartz vessel was placed in a 3 L autoclave equipped with a stirrer. The slurry in the autoclave was stirred at 200 rpm and heated to 120° C., and oxygen was supplied into the autoclave to increase the pressure in the autoclave to 2.0 MPa. The pressure in the autoclave was kept for 1 hour by supplying oxygen. Then, the autoclave was cooled to room temperature and the pressure in the autoclave was reduced. Then, the slurry was taken out of the autoclave and separated by filtration into a leach residue 1 and a leach solution.

The thus obtained leach residue 1 was washed with pure water, and 110 g of the recovered leach residue 1 was mixed with 500 mL of water and stirred for 3 minutes to prepare a slurry. The slurry was placed in an Agitair laboratory flotation machine having a cell volume of 0.5 L, 200 mg of methyl isobutyl carbinol (MIBC) was added to the slurry as a frother per kg of the leach residue, and 100 mg of PAX (trade name: Potassium Amyl Xanthate) manufactured by Cytec Industries Inc. (US) was added to the slurry as a collector per kg of the leach residue.

The slurry was stirred for 10 minutes, and then flotation was performed by blowing air into the slurry at a flow rate of 2 L/min for 8 minutes while keeping stirring. As a result, 60 g of a float fraction 1 and 50 g of a sink fraction 1 were obtained. It is to be noted that in Example 4, a float fraction and a sink fraction were obtained by performing flotation once, but flotation may be repeatedly performed depending on the properties of a leach residue treated. In this case, the number of repetitions of flotation can be determined by appropriately performing a preliminary test.

The float fraction 1 obtained by flotation was identified by chemical analysis, microscope observation, and X-ray diffraction. As a result, it was found that the float fraction 1 was mainly composed of unreacted sulfide mineral components and elemental sulfur and that the gold grade of the float fraction 1 was 5 g/t. The sink fraction 1 was also identified in the same manner, and as a result, it was found that the sink fraction 1 was mostly occupied by iron oxide and gangue components and that the gold grade of the sink fraction 1 was less than 1 g/t, that is, the sink fraction hardly contained gold.

Then, 60 g of the obtained float fraction 1 was placed in a tubular furnace using a transparent quartz tube. The furnace was heated to 400° C. while a nitrogen gas was allowed to flow through the furnace at a flow rate of 1 L/min, and elemental sulfur was removed by volatilization for 4 hours while the float fraction 1 in the furnace was visually observed from outside the furnace. As a result, 29 g of a desulfurized product 1 was obtained. The desulfurized product 1 was identified by X-ray diffraction, and as a result, it was confirmed that elemental sulfur was completely removed by volatilization. The gold grade of the desulfurized product 1 was increased to 10 g/t.

The desulfurized product 1 was returned to the leaching step and subjected to leaching together with a fresh copper concentrate under the same conditions as described above. Then, the flotation step and the desulfurization step were performed to obtain 32 g of a desulfurized product 2. The gold grade of the desulfurized product 2 was 16 g/t. Further, the desulfurized product 2 was again returned to the leaching step, and leaching, flotation, and desulfurization were performed under the same conditions as described above to obtain 26 g of a desulfurized product 3. The gold grade of the desulfurized product 3 was 24 g/t.

In Example 4, the copper concentrate, leach residues 1 to 3, float fractions 1 to 3, sink fractions 1 to 3, and desulfurized products (gold-bearing residues) 1 to 3 were each dissolved in aqua regia and analyzed by ICP to determine the Cu content, Fe content, S content, and Au content of each of them, and these contents and the weight of each of the copper concentrate, leach residues 1 to 3, float fractions 1 to 3, sink fractions 1 to 3, and desulfurized products (gold-bearing residues) 1 to 3 are shown in Table 2. It is to be noted that in Table 2, the Cu content, Fe content, and S content are expressed in percent by weight (wt %), and the Au content is expressed in grams per ton (g/t).

TABLE 2

| | Weight (g) | Cu (wt %) | Fe (wt %) | S (wt %) | Au (g/t) |
|---|---|---|---|---|---|
| Copper concentrate | 200 | 19.7 | 25.7 | 29.7 | 2 |
| Leach residue 1 | 110 | 3.8 | 17.5 | 27.4 | 3 |
| Float fraction 1 | 60 | 9.7 | 14.5 | 69.6 | 5 |
| Sink fraction 1 | 50 | 0.5 | 52.9 | 17.5 | <1 |
| Desulfurized product 1 | 29 | 17.4 | 26.3 | 34.4 | 10 |
| Leach residue 2 | 125 | 2.4 | 21.1 | 21.8 | 6 |
| Float fraction 2 | 65 | 11.1 | 13.6 | 72.3 | 9 |
| Sink fraction 2 | 60 | 0.36 | 53.6 | 19.2 | <1 |
| Desulfurized product 2 | 32 | 24.2 | 25.2 | 34.3 | 16 |
| Leach residue 3 | 114 | 2.7 | 21.6 | 24.4 | 9 |
| Float fraction 3 | 61 | 9.1 | 13.6 | 71.1 | 16 |
| Sink fraction 3 | 53 | 0.29 | 50.9 | 19.2 | <1 |
| Desulfurized product 3 | 26 | 17.7 | 26.7 | 34.6 | 24 |

As can be seen from the result shown in Table 2, the gold grade of the desulfurized product (gold-bearing residue) was increased from 10 g/t through 16 g/t to 24 g/t as the number of repetitions of the steps of leaching, flotation, and desulfurization was increased.

Although the present invention has been described in detail, it should be appreciated by those skilled in the art that various variations, alterations, and modifications can be made without departing from the broadest scope of the present invention. Thus, it is intended that the present invention covers variations and modifications within the scope of the appended claims and their equivalents. This application is based on Japanese Patent Application Nos. 2009-084108 and 2009-205537 which are incorporated herein by reference.

What is claimed is:

1. A method for concentrating gold contained in a copper sulfide mineral, comprising:
   a leaching step of subjecting a gold-bearing copper sulfide mineral to pressure leaching with sulfuric acid at a temperature higher than 102° C. and 112° C. or lower to obtain a leach residue;
   a flotation step of subjecting the leach residue to flotation to separate it into a float fraction and a sink fraction;
   a desulfurization step of subjecting the float fraction to desulfurization to obtain a desulfurized product;
   an oxidative roasting step of subjecting the desulfurized product to oxidative roasting to obtain an oxidatively-roasted product; and
   a separation step of dissolving the oxidatively-roasted product in a sulfuric acid solution to obtain a copper solution and a gold-bearing residue and separating the gold-bearing residue from the copper solution.

2. The method for concentrating gold contained in a copper sulfide mineral according to claim 1, wherein in the desulfurization step, the float fraction is heated at a temperature of 250° C. or higher and 800° C. or lower under an inert atmosphere of flowing nitrogen gas or argon gas.

3. The method for concentrating gold contained in a copper sulfide mineral according to claim 1, wherein in the oxidative roasting step, the desulfurized product is heated at a temperature of 600° C. or higher and 800° C. or lower under an atmosphere of flowing oxygen or air.

4. The method for concentrating gold contained in a copper sulfide mineral according to claim 2, wherein in the oxidative roasting step, the desulfurized product is heated at a temperature of 600° C. or higher and 800° C. or lower under an atmosphere of flowing oxygen or air.

5. The method for concentrating gold contained in a copper sulfide mineral according to claim 1, wherein the pressure leaching is performed by placing a slurry obtained by mixing the copper sulfide mineral and the sulfuric acid in an autoclave.

6. The method for concentrating gold contained in a copper sulfide mineral according to claim 5, wherein in the pressure leaching, oxygen is introduced into the autoclave so that a pressure in the autoclave is 0.5 to 2.0 MPa higher than a pressure in equilibrium with the slurry.

7. The method for concentrating gold contained in a copper sulfide mineral according to claim 5, wherein after completion of the pressure leaching, the leach residue is separated from a leach solution by filtering the slurry.

8. The method for concentrating gold contained in a copper sulfide mineral according to claim 1, wherein the gold-bearing residue is subjected to leaching with cyanide, thiourea, or thiosulfate to extract gold.

9. The method for concentrating gold contained in a copper sulfide mineral according to claim 1, wherein the sulfuric acid solution used in the separation step has a concentration of 200 g/L to 500 g/L.

10. The method for concentrating gold contained in a copper sulfide mineral according to claim 1, wherein in the separation step, a slurry obtained by dissolving the oxidatively-roasted product in the sulfuric acid solution has a concentration of 100 g/L to 300 g/L.

11. The method for concentrating gold contained in a copper sulfide mineral according to claim 1, wherein the copper solution obtained in the separation step is subjected to electrowinning to recover copper as electrolytic copper.

12. The method for concentrating gold contained in a copper sulfide mineral according to claim 11, wherein sulfuric acid regenerated by the electrowinning is used as a leachant in the leaching step or used to dissolve copper in the separation step.

13. A method for concentrating gold contained in a leach residue of a gold-bearing copper sulfide mineral obtained in a copper hydrometallurgical process to obtain a gold-bearing residue, the method comprising:
   a leaching step of subjecting a gold-bearing copper sulfide mineral to leaching with sulfuric acid to obtain a leach residue;
   a flotation step of subjecting the leach residue to flotation to separate it into a float fraction and a sink fraction; and
   a desulfurization step of subjecting the float fraction to desulfurization to obtain a desulfurized product, wherein the desulfurized product is returned to the leaching step to repeatedly perform the leaching step, the flotation step, and the desulfurization step in this order to obtain a gold-bearing residue in which gold is concentrated.

14. The method for concentrating gold contained in a copper sulfide mineral according to claim 13, wherein in the desulfurization step, the float fraction is heated at a temperature of 250° C. or higher and 800° C. or lower under an inert atmosphere of flowing nitrogen gas or argon gas.

15. The method for concentrating gold contained in a copper sulfide mineral according to claim 13, wherein in the desulfurization step, the float fraction is heated at a temperature of approximately 165° C. under an atmosphere of water vapor.

16. The method for concentrating gold contained in a copper sulfide mineral according to claim 13, wherein in the leaching step, the copper sulfide mineral is subjected to pressure leaching with sulfuric acid at a temperature higher than 102° C. and 112° C. or lower.

17. The method for concentrating gold contained in a copper sulfide mineral according to claim 13, wherein a pressure leaching is performed by placing a slurry obtained by mixing the copper sulfide mineral and a sulfuric acid solution in an autoclave.

18. The method for concentrating gold contained in a copper sulfide mineral according to claim 17, wherein in the pressure leaching, oxygen is introduced into the autoclave so that a pressure in the autoclave is 0.5 to 2.0 MPa higher than a pressure in equilibrium with the slurry.

19. The method for concentrating gold contained in a copper sulfide mineral according to claim 17, wherein after completion of the pressure leaching, the leach residue is separated from a leach solution by filtering the slurry.

20. The method for concentrating gold contained in a copper sulfide mineral according to claim 13, wherein the gold-bearing residue is subjected to leaching with cyanide, thiourea, or thiosulfate to extract gold.

* * * * *